(12) United States Patent
Tan (10) Patent No.: US 8,843,813 B2
(45) Date of Patent: *Sep. 23, 2014

(54) SYSTEMS AND METHODS FOR MEDIA DEFECT DETECTION

(71) Applicant: AGERE Systems Inc, Allentown, PA (US)

(72) Inventor: Weijun Tan, Longmont, CO (US)

(73) Assignee: AGERE Systems Inc, Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/902,808

(22) Filed: May 25, 2013

(65) Prior Publication Data

US 2013/0305129 A1 Nov. 14, 2013

Related U.S. Application Data

(63) Continuation of application No. 12/527,296, filed as application No. PCT/US2007/080043 on Oct. 1, 2007, now Pat. No. 8,453,039.

(51) Int. Cl.
*G06F 11/00* (2006.01)
*H04L 1/00* (2006.01)
*G11B 20/18* (2006.01)
*G06F 11/07* (2006.01)

(52) U.S. Cl.
CPC .......... *G06F 11/0751* (2013.01); *H04L 1/0051* (2013.01); *H04L 1/0055* (2013.01); *G11B 20/1816* (2013.01)
USPC ............ 714/795; 714/794; 714/763; 714/780

(58) Field of Classification Search
CPC ............ G06F 11/1068; G06F 11/0751; G06F 11/1004; G06F 11/1072; G06F 12/0246; G06F 17/30144; G06F 2212/7209
See application file for complete search history.

(56) References Cited

U.S. PATENT DOCUMENTS

| 5,802,069 A | 9/1998 | Coulson |
| 6,065,149 A | 5/2000 | Yamanaka |
| 6,301,679 B1 | 10/2001 | Tan |

(Continued)

FOREIGN PATENT DOCUMENTS

| EP | 0549151 | 6/1993 |
| EP | 1096491 | 10/2005 |

(Continued)

OTHER PUBLICATIONS

Bagul, Y.,G.: "Assessment of current health and remaining useful life of hard disk drives" [online] Jan. 1, 2009 [ret. on Oct. 14, 2010] Ret. from the internet:<URL;http://iris.neu.

(Continued)

*Primary Examiner* — Scott Baderman
*Assistant Examiner* — Jason Bryan
(74) *Attorney, Agent, or Firm* — Hamilton DeSanctis & Cha (57) ABSTRACT

Various embodiments of the present invention provide systems and methods for media defect detection. For example, a data transfer system is disclosed that includes a data detector, a defect detector and a gating circuit. The data detector provides a soft output, and the defect detector is operable to receive the soft output and the data signal, and to assert a defect indication based at least in part on the soft output and the data signal. The gating circuit is operable to modify the soft output of the detector whenever the defect indication is asserted.

20 Claims, 9 Drawing Sheets

(56) References Cited

U.S. PATENT DOCUMENTS

| | | |
|---|---|---|
| 6,446,236 B1 | 9/2002 | McEwen et al. |
| 6,557,113 B1 | 4/2003 | Wallentine et al. |
| 6,691,263 B2 | 2/2004 | Vasic et al. |
| 6,697,977 B2 | 2/2004 | Ozaki |
| 6,731,442 B2 | 5/2004 | Jin et al. |
| 6,738,948 B2 | 5/2004 | Dinc et al. |
| 6,980,382 B2 | 12/2005 | Hirano et al. |
| 7,154,936 B2 | 12/2006 | Bjerke et al. |
| 7,168,030 B2 | 1/2007 | Ariyoshi |
| 7,173,784 B2 | 2/2007 | Cideciyan et al. |
| 7,203,015 B2 | 4/2007 | Sakai et al. |
| 7,237,173 B2 | 6/2007 | Morita et al. |
| 7,254,192 B2 | 8/2007 | Onggosanusi et al. |
| 7,257,172 B2 | 8/2007 | Okamoto et al. |
| 7,359,313 B2 | 4/2008 | Chan et al. |
| 7,441,174 B2 | 10/2008 | Li et al. |
| 7,457,212 B2 | 11/2008 | Oh |
| 7,652,966 B2 | 1/2010 | Kadokawa |
| 7,688,915 B2 | 3/2010 | Tanrikulu et al. |
| 7,702,973 B2 | 4/2010 | Mead et al. |
| 7,852,722 B2 | 12/2010 | Kikugawa et al. |
| 8,095,855 B2 | 1/2012 | Tan et al. |
| 8,161,357 B2 | 4/2012 | Tan et al. |
| 8,190,831 B2 | 5/2012 | Lee et al. |
| 8,201,051 B2 | 6/2012 | Tan et al. |
| 8,453,039 B2 | 5/2013 | Tan |
| 2002/0041459 A1 | 4/2002 | Singer |
| 2003/0043487 A1 | 3/2003 | Morita et al. |
| 2003/0063405 A1 | 4/2003 | Jin et al. |
| 2003/0066020 A1 | 4/2003 | Morita |
| 2003/0147172 A1 | 8/2003 | Singer et al. |
| 2007/0061687 A1 | 3/2007 | Hwang |
| 2009/0235116 A1 | 9/2009 | Tan |
| 2009/0235146 A1 | 9/2009 | Tan |
| 2009/0271670 A1 | 10/2009 | Tan |
| 2010/0042877 A1 | 2/2010 | Tan |

FOREIGN PATENT DOCUMENTS

| | | |
|---|---|---|
| JP | 2001-176213 | 6/2001 |
| JP | 2003/515861 | 5/2003 |
| WO | WO 01/39188 | 5/2001 |

OTHER PUBLICATIONS

Cruz J R et al "Erasure Detection Algorithms for Magnetic Recording Channels" IEEE Transactions on Magnetices vol. 40 No. 4, Jul. 1, 2004.

Cruz J R et al "Detection of Media Defects in Perpendicular Magnetic Recording Channels" IEEE Transactions on Magnetics vo. 41, No. 10 Oct. 1, 2005.

ECMA: Standardizing Information and Communication Systems: "Standard ECMA-272: 120 mm DVD Rewritable Disk (DVD-RAM)" Standard ECMA, , No. 272, Feb. 1, 1998 pp. 43-51.

Galbraith et al, "Iterative Detection Read Channel Technology in Hard Disk Drives" [online] Oct. 1, 2008 [ret. on Oct. 1, 2008] Ret. from Internet<URL:http://www.hitachigst.com.

Kavcic et al., "A Signal-Dependent Autoregressive Channel Model", IEEE Transactions on Magnetics, vol. 35, No. 5, Sep. 1999 pp. 2316-2318.

Mathew et al "Thermal Asperity Suppression in Perpendicular Recording Channels" IEEE Transactions on Magnetics vol. 41 No. 10, Oct. 1, 2005.

Nakamura, et al. "Performance Evaluation of LDPC Coding and Iterative Decoding System Using Burst Information" Jml of Institute of elec. Infrom, and Communication Eng. May 2007.

Sarigoz et al "Dropout-Tolerant Read Channels" IEEE Journal on Selected Areas in Communication, Apr. 2001 vol. 19, p. 744-755.

SYSTEMS AND METHODS FOR MEDIA DEFECT DETECTION

CROSS REFERENCE TO RELATED APPLICATIONS

The present application claims priority to (is a continuation of) U.S. patent application Ser. No. 12/527,296 entitled "Systems and Methods for Media Defect Detection", and filed Aug. 14, 2009 by Tan; which is a national stage filing of PCT/US2007/80043 of the same title filed Oct. 1, 2007. The entirety of the aforementioned provisional patent application is incorporated herein by reference for all purposes.

BACKGROUND OF THE INVENTION

The present inventions are related to systems and methods for transferring information, and more particularly to systems and methods for determining problems related to a medium associated with a data transfer.

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. The effectiveness of any transfer is impacted by any defects associated with the transfer medium. In some cases, data loss caused by defects in the transfer medium can make recovery of data from the transfer medium difficult even for data received from non-defective areas or times.

Various approaches have been developed for identifying defects in the transfer medium. Such approaches provide a general ability to identify defects, but in many cases are inaccurate. In the best case, this inaccuracy limits the effectiveness of any defect identification. In the worst case, inaccurate defect detection may actually hamper the data recovery process.

Hence, for at least the aforementioned reasons, there exists a need in the art for advanced systems and methods for defect detection.

BRIEF SUMMARY OF THE INVENTION

The present inventions are related to systems and methods for transferring information, and more particularly to systems and methods for determining problems related to a medium associated with a data transfer.

Various embodiments of the present invention provide systems and methods for media defect detection. Some particular embodiments of the present invention provide data transfer systems that include a data detector, a defect detector and a gating circuit. The data detector provides a soft output, and the defect detector is operable to receive the soft output and the data signal, and to assert a defect indication based at least in part on the soft output and the data signal. The gating circuit is operable to modify the soft output of the detector whenever the defect indication is asserted. In some instances of the aforementioned embodiments, the data detector may be, but is not limited to, a Viterbi detector or a maximum a posteriori probability detector.

In various instances of the aforementioned embodiments, the system is a hard disk drive. In such systems, the hard disk drive includes a storage medium, and the data signal is derived from the storage medium. The data detector receives the data signal derived from the storage medium and provides the soft output based at least in part on the data signal. The defect detector is operable to detect defective regions on the storage medium. In some cases, the defect detector includes a data analysis circuit, a soft analysis circuit, and two counter circuits. The data analysis circuit includes a first comparator operable to compare an absolute value of the data signal against a data threshold value, and one of the counter circuits is operable to determine a number of periods that the absolute value of the data signal is below the data threshold value. The soft analysis circuit includes a second comparator operable to compare the soft output against a soft threshold value, and the other counter circuit is operable to determine a number of periods that the soft output is below the soft threshold.

In some instances of the aforementioned embodiments, the data signal is filtered using a high pass filter prior to comparison against the data threshold value. In various instances of the aforementioned embodiments, the data threshold value and the soft threshold value are programmable. In particular instances of the aforementioned embodiments, the defect indication is asserted whenever at least one of the first counter and the second counter exceeds a count threshold. Further, the counter associated with the data signal comparison is reset whenever the absolute value of the data signal exceeds the data signal threshold, and wherein the other counter is reset whenever the soft output exceeds the soft threshold. In particular cases, once the defect indication is asserted, it is maintained asserted for at least a minimum period. The minimum period may be programmable.

In other instances of the aforementioned embodiments, the system is a communication device. In such instances, the communication device receives information via a communication channel, and the data signal is derived from the communication channel. The data detector receives the data signal derived from the communication channel and provides the soft output based at least in part on the data signal. The defect detector is operable to detect defective periods of the communication channel.

Other embodiments of the present invention provide methods for defect detection. Such methods include receiving a data signal, and performing a detection process on the data signal. The detection process provides a soft output. The methods further include comparing the data signal to a data threshold, and comparing the soft output to a soft threshold. The comparison causes assertion of a data comparison result whenever the data signal is less than the data threshold for a first determined period, and assertion of a soft comparison result whenever the soft output is less than the soft threshold for a second determined period. The methods further include asserting a defect indicator whenever at least one of the soft comparison result and the data comparison result is asserted. In some cases, the defect detector is only asserted when both of the soft comparison result and the data comparison result are asserted. In various instances of the aforementioned embodiments, the first determined period and the second determined period are the same period, and the common period is programmable.

Various instances of the aforementioned embodiments include determining an absolute value of the data signal. In such cases, the data signal that is compared with the data threshold is the absolute value of the data signal. Further, some embodiments of the present invention include determining an absolute value of the soft output. In such cases, the soft output that is compared with the soft threshold is the absolute value of the soft output. Yet further, some embodiments of the present invention include filtering the data signal. In such cases, the data signal that is compared with the data threshold is the filtered data signal.

Yet other embodiments of the present invention provide storage systems. Such storage systems include a storage medium, a read/write circuit, and a positioning controller. At least a portion of the read/write circuit is disposed in relation to the storage medium, and the positioning controller is operable to position at least a portion of the read/write circuit in relation to the storage medium. The read/write circuit includes, but is not limited to: a data detector that provides a soft output, a defect detector, and a gating circuit. The defect detector is operable to receive the soft output, and to assert a defect indication based at least in part on the soft output. The gating circuit is operable to modify the soft output of the detector whenever the defect indication is asserted. In some instances of the aforementioned embodiments, the storage system is incorporated in an electronic system. Such electronic systems include, but are not limited to, a computer, an audio player, a video player, a stand alone storage system, and/or a cellular telephone. Such computers may be, but are not limited to, a personal computer, a notebook compute, a server, and/or a personal digital assistant.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIG. 2b depicts timing diagrams of exemplary signals applied to and received from the defect detection circuit of FIG. 2a;

FIG. 3b depicts timing diagrams of exemplary signals applied to and received from the defect detection circuit of FIG. 3a;

FIG. 4b depicts timing diagrams of exemplary signals applied to and received from the defect detection circuit of FIG. 4a;

DETAILED DESCRIPTION OF THE INVENTION

The present inventions are related to systems and methods for transferring information, and more particularly to systems and methods for determining problems related to a medium associated with a data transfer.

It is known that media defects may cause burst of errors around the defective area and or about the defective time associated with the media. In many cases errors associated with many media defects are localized and not propagated. Thus, it has generally been considered that error propagation due to media defects is not a significant problem. It has been discovered, however, that in various conditions propagation of errors due to media defects may be a problem. In particular, it appears that in multiple detector/decoder implementations that these errors may propagate where reasonably high soft probabilities are reported in relation to data retrieved from a defective region or during a defective time period. Some embodiments of the present invention address this problem by incorporating soft output information into a media defect determination process.

Figure 1:
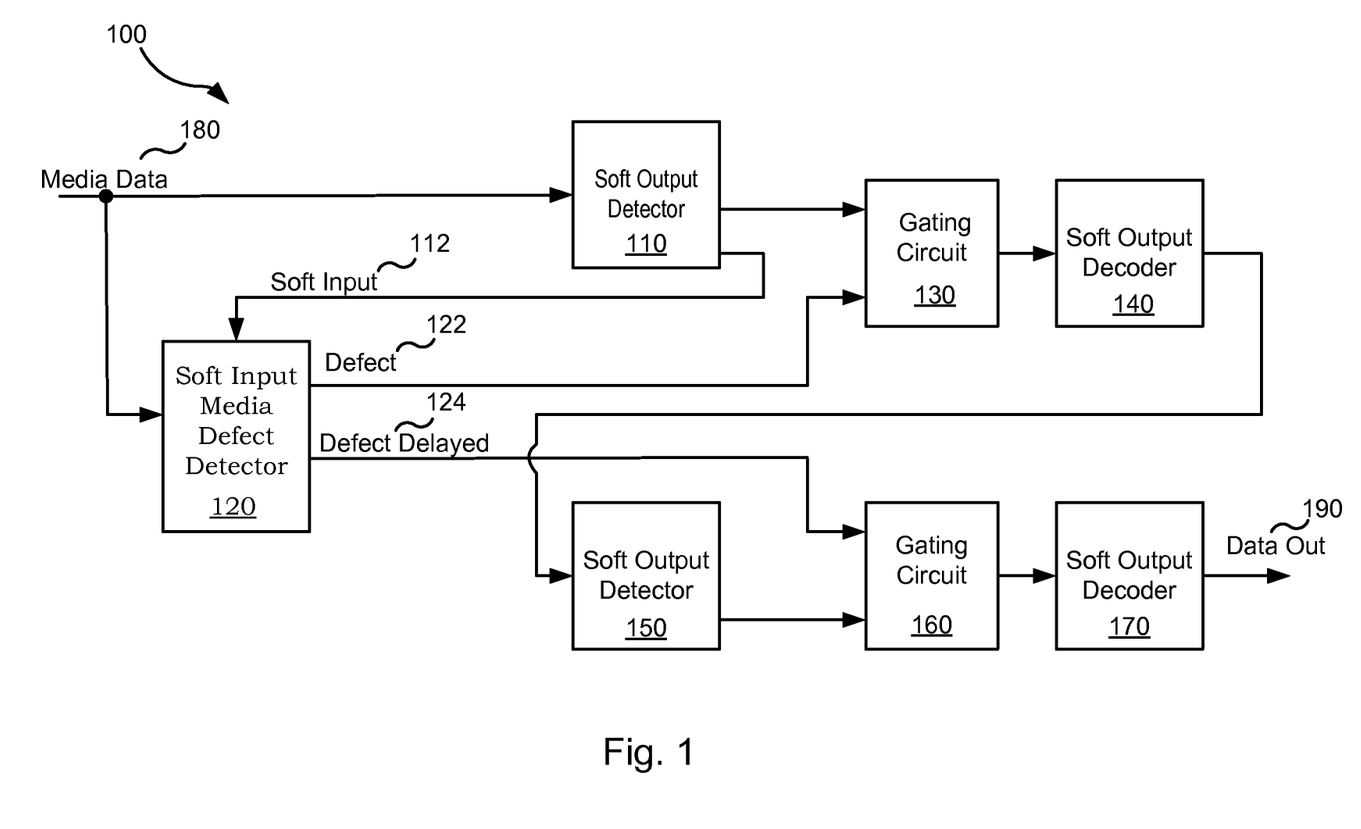
FIG. 1 depicts a defect detection system in accordance with various embodiments of the present invention.

Turning to FIG. 1, a defect detection system 100 in accordance with various embodiments of the present invention is depicted. Defect detection system 100 includes a soft input media defect detector 120, soft output detectors 110, 150, gating circuits 130, 160, and soft output decoders 140. Soft output detectors 110, 150 may be any detector known in the art that are capable of providing soft output information (i.e., a probability that detected data has been correctly identified). Thus, soft output detectors may be, but are not limited to, soft output Viterbi algorithm detectors (SOVA) or maximum a posteriori probability (MAP) detectors as are known in the art. Based on the disclosure provided herein, one of ordinary skill in the art will recognize a variety of detectors that may be used in relation to different embodiments of the present invention.

Media data 180 is received from some form of media and transferred to defect detection system 100. Thus, for example, where defect detection system 100 is implemented as part of a hard disk drive system, media data 180 may be derived from a magnetic storage medium incorporated in the hard disk drive system. As another example, where defect detection system 100 is implemented as part of a communication system, media data 180 may be derived from a wireless or other transfer medium between a sending and receiving device. Based on the disclosure provided herein, one of ordinary skill in the art will recognize a variety of media from which media data 180 may be derived.

Media data 180 is provided to soft output detector 110 and to soft input media defect detector 120. Soft output detector 110 performs a detection function on media data 180 and provides a soft input 112 to soft input media defect detector 120. Soft media defect detector 120 analyzes media data 180 in combination with soft input 112 to determine whether the media from which media data 180 exhibits a defect around where media data 180 was retrieved. Whenever a defect is identified by soft input media defect detector 120, a defect output 122 and a defect delay output 124 are asserted. Defect output 122 is provided to gating circuit 130 along with an output from soft output detector 110. When defect output 122 is asserted, gating circuit 130 causes the soft output from soft output detector 110 to be asserted such that the indicated probability that media data 180 has been properly detected is zero. This "zero" probability is provided to soft output decoder 140 where it is used to decode media data 180. Soft output decoder 140 may be any data decoder known in the art. By zeroing the soft output information coincident with an identification of a media defect, gating circuit 130 operates to limit the possibility that soft output decoder 140 would improperly identify data from the defective area as correct.

The output from soft output decoder 140 is provided to soft output detector 150 that performs another detection process and provides another soft output indicating the likelihood of correct data. Defect delay output 124 is provided along with the output form soft output detector 150 to gating circuit 160. Defect delay output 124 is a version of defect output 122 delayed sufficiently to match the timing delays incurred by passing media data 180 through gating circuit 130, soft output decoder 140 and soft output detector 150. Similar to gating circuit 130, when defect delay output 124 is asserted, gating circuit 160 causes the soft output from soft output detector 150 to be asserted such that the indicated probability that media data 180 has been properly detected is zero. This "zero" probability is provided to soft output decoder 170 where it is used to decode media data 180. Soft output decoder 170 may be any data decoder known in the art. By zeroing the soft output information coincident with an identification of a media defect, gating circuit 160 operates to limit the possibility that soft output decoder 170 would improperly identify data from the defective area as correct. Soft output decoder 170 provides a data output 190 that may either be used, or may be applied to further detection/decoding stages depending upon the particular design.

Figure 2A:
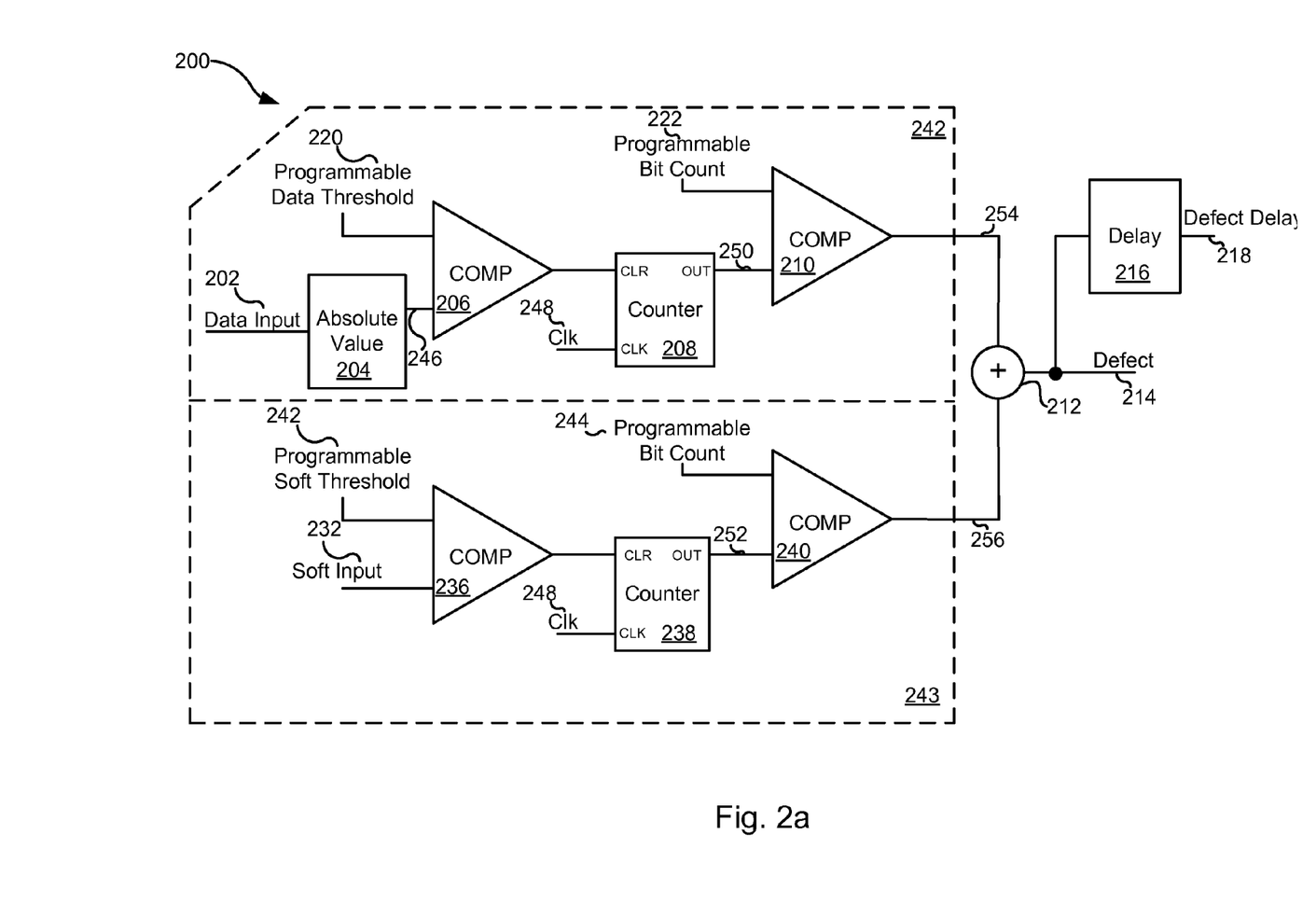
FIG. 2a shows a particular implementation of a defect detection circuit in accordance with some embodiments of the present invention.

Turning to FIG. 2a, a soft input defect detection circuit 200 in accordance with some embodiments of the present invention is shown. Soft input defect detection circuit 200 includes a data analysis circuit 241 (shown in dashed lines), a soft analysis circuit 243 (shown in dashed lines), and a combination circuit 212. Data analysis circuit 241 is designed to identify a potential media defect based on a data input 202 derived from a medium at issue. Soft analysis circuit 243 is designed to identify a potential media defect based on a soft input 232 received from a soft output detector (not shown). Combination circuit 212 is designed to combine the results of both data analysis circuit 241 and soft analysis circuit 243 to make a determination of whether a media defect exists, and based on the determination to assert a defect output 214. Soft input defect detection circuit 200 may also include a delay circuit 216 that receives defect output 214 and delays it for use in a later stage decode/detection process where such is desired. The delayed output is identified as defect delay output 218.

Data analysis circuit 241 includes an absolute value circuit 204 that receives data input 202 and performs an offset process to yield the absolute value of data input 202. An absolute value 246 of data input 202 is provided to a comparator 206 that compares the absolute value 246 against a programmable data threshold 220. Where absolute value 246 exceeds programmable data threshold 220, a counter 208 is cleared. Otherwise, where absolute value 246 is less than programmable data threshold 220, counter 208 continues to increment synchronous to a clock 248. A counter output 250 is provided to a comparator 210 where it is compared against a programmable bit count 222. Where counter output 250 exceeds programmable bit count 222, a media defect indication 254 is asserted based on data input 202.

Soft analysis circuit 243 includes a comparator 236 that compares soft input 232 against a programmable soft threshold 242 (it should be noted that soft input 232 may be provided to an absolute value circuit similar to circuit 204 and the absolute value used for later comparison where necessary). Where soft input 232 exceeds programmable soft threshold 242, a counter 238 is cleared. Otherwise, where soft input 232 is less than programmable soft threshold 242, counter 238 continues to increment synchronous to clock 248. A counter output 252 is provided to a comparator 240 where it is compared against a programmable bit count 244. Where counter output 252 exceeds programmable bit count 244, a media defect indication 256 is asserted based on soft input 232.

Media defect indication 254 and media defect indication 256 are combined by combination circuit 212. In some cases, combination circuit 212 performs the equivalent of a logical AND of media defect indication 254 and media defect indication 256, and the output of the logical AND is defect output 214. Performing such a combination operates to limit the possibility that a false positive is output from soft input defect detection circuit 200. In other cases, combination circuit 212 performs the equivalent of a logical OR of media defect indication 254 and media defect indication 256, and the output of the logical OR is defect output 214. Performing such a combination operates to limit the possibility that a false negative is output from soft input defect detection circuit 200. Based on the disclosure provided herein, one of ordinary skill in the art will recognize a variety of combination circuits that may be used to combine media defect indication 254 and media defect indication 256 to generate defect output 214.

Figure 2B:
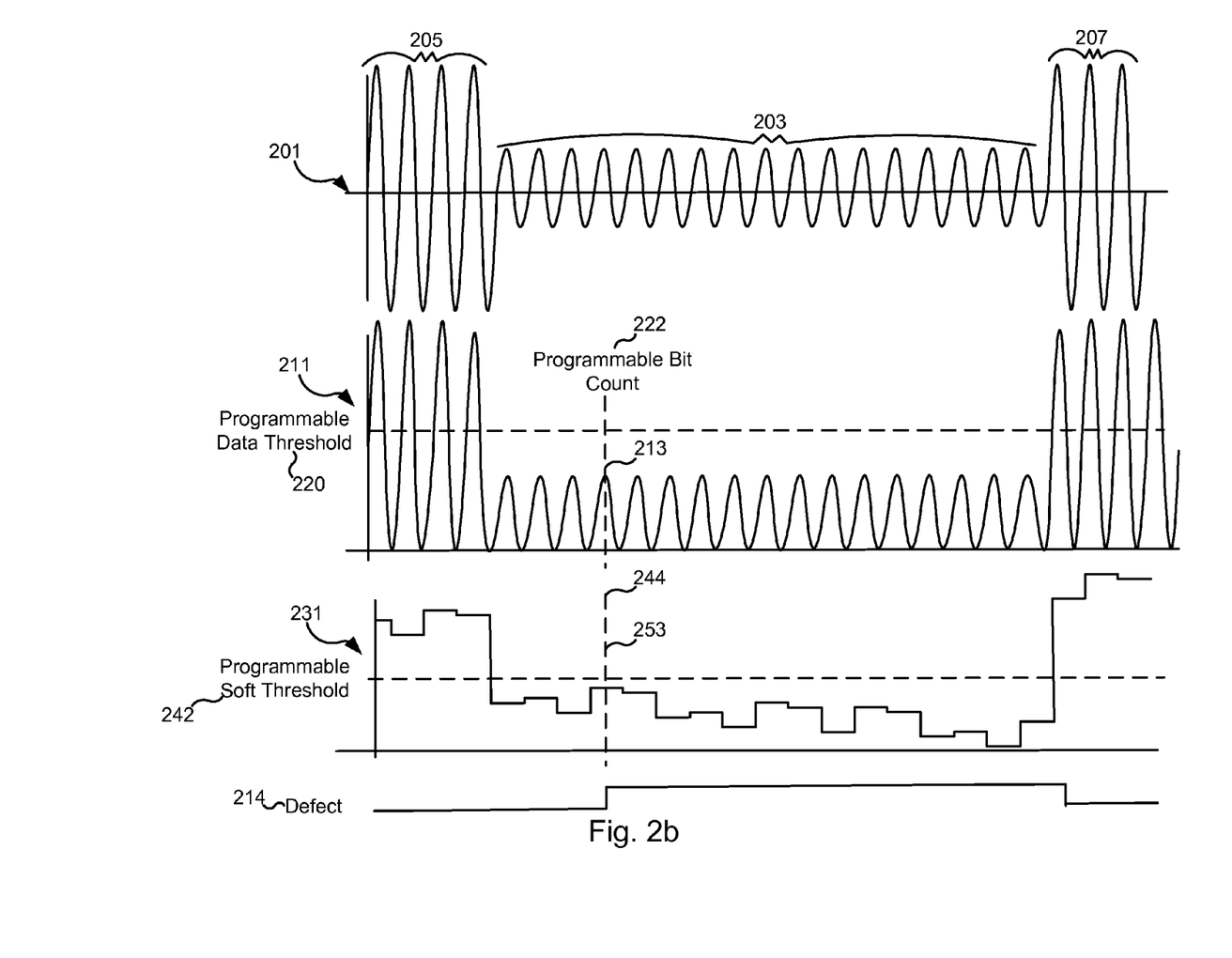

Turning to FIG. 2b, timing diagrams 201, 211, 231 depict the operation of soft input defect detection circuit 200 based on exemplary inputs consistent with those discovered in investigation. In particular, timing diagram 201 shows an exemplary data input 202 including periods where data is received from a non-defective medium 205, 207, and a period 203 where data is received from a defective medium. Data from the non-defective medium (portions 205, 207) exhibits a relatively high amplitude when compared with that from the defective medium (portion 203). Timing diagram 211 depicts the absolute value of the signal of timing diagram 201. This absolute value represents absolute value 246 of FIG. 2a. Satisfaction of the comparison with programmable bit count 222 is represented on timing diagram 211 as a dashed line 213. In this case, programmable bit count is four, and is satisfied as soon as four consecutive values of absolute value 246 are recorded below programmable data threshold 220. As previously discussed, as soon as these four consecutive periods have been achieved, media defect indication 254 is asserted. It should be noted that the number of four periods is merely exemplary and that any number of periods may be programmed in accordance with the various embodiments of the present invention.

Timing diagram 211 depicts soft input 232 (whether raw or the absolute value thereof) being compared to programmable soft threshold 242. Satisfaction of the comparison with programmable bit count 244 is represented on timing diagram 231 as a dashed line 233. In this case, programmable bit count is four, and is satisfied as soon as four consecutive values soft input 232 are recorded below programmable soft threshold 242. As previously discussed, as soon as these four consecutive periods have been achieved, media defect indication 256 is asserted. Again, it should be noted that the number of four periods is merely exemplary and that any number of periods may be programmed in accordance with the various embodiments of the present invention.

Defect output 214 is also shown. As shown, defect output 214 is asserted whenever either or both of media defect indication 254 and media defect indication 256 are asserted. Unlike that show in FIG. 2b, in some cases programmable bit threshold 222 and programmable bit threshold 244 are satisfied at different points in time. In such a case, defect output 214 will assert at a different point in time depending upon whether combination circuit 212 is a logical AND function, a logical OR function, or some other function.

Figure 3A:
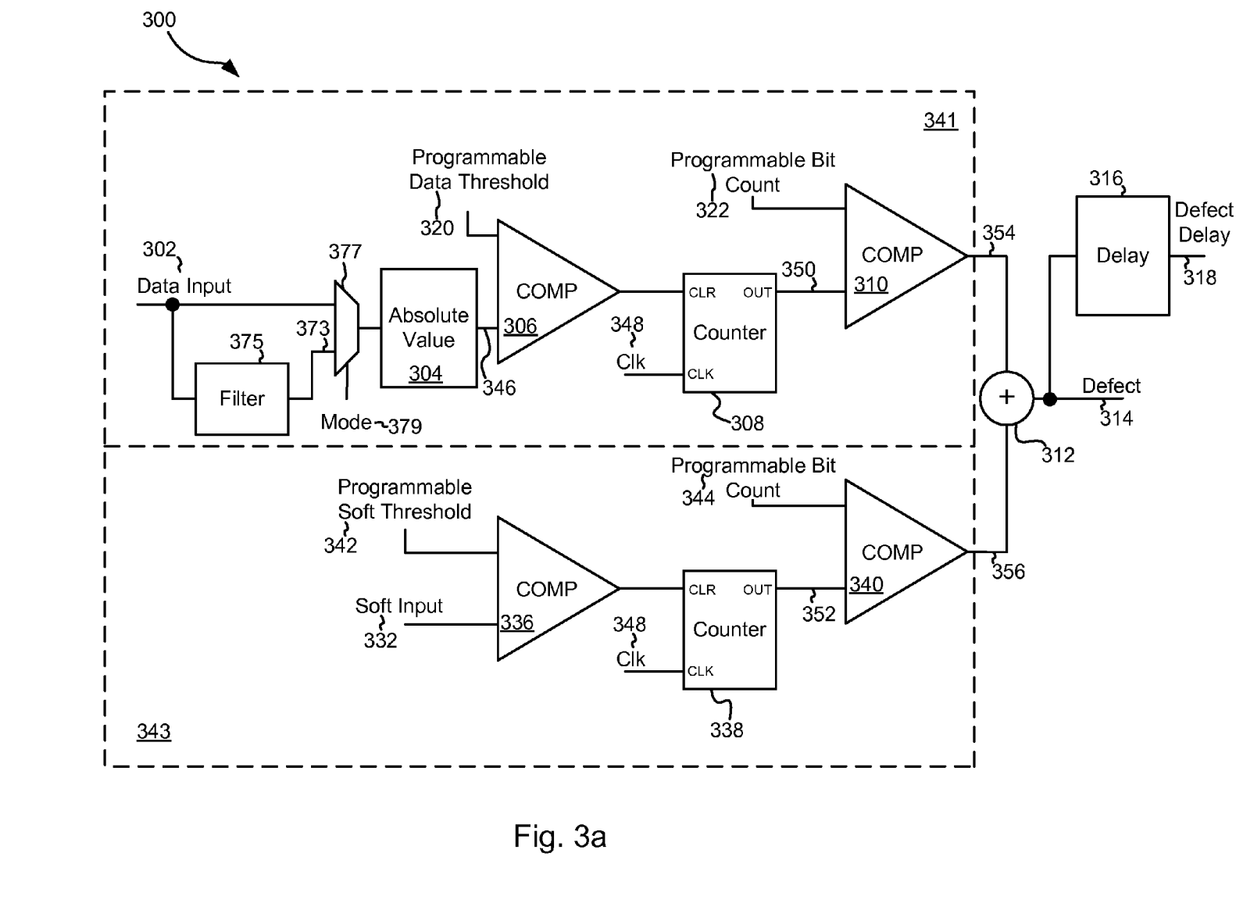
FIG. 3a shows another particular implementation of a defect detection circuit including data filtering in accordance with some embodiments of the present invention.

Turning to FIG. 3a, a soft input defect detection circuit 300 in accordance with various embodiments of the present invention is shown. Soft input defect detection circuit 300 includes a data analysis circuit 341 (shown in dashed lines), a soft analysis circuit 343 (shown in dashed lines), and a combination circuit 312. Data analysis circuit 341 is designed to identify a potential media defect based on a data input 302 derived from a medium at issue. Soft analysis circuit 343 is designed to identify a potential media defect based on a soft input 332 received from a soft output detector (not shown). Combination circuit 312 is designed to combine the results of both data analysis circuit 341 and soft analysis circuit 343 to make a determination of whether a media defect exists, and based on the determination to assert a defect output 314. Soft input defect detection circuit 300 may also include a delay circuit 316 that receives defect output 314 and delays it for use in a later stage decode/detection process where such is desired. The delayed output is identified as defect delay output 318.

Data analysis circuit 341 includes a filter 375 and a multiplexer 377 that allows for selection of either a raw data input 302, or a filtered version 373 of data input 302. A mode selector 379 selects the desired data input 302 or filtered version 373. The output of multiplexer 377 is provided to an absolute value circuit 304. Absolute value circuit 304 receives the selected version of data input 302 and performs an offset process to yield the absolute value of the selected version of data input 302. An absolute value 346 of data input 302 is provided to a comparator 306 that compares the absolute value 346 against a programmable data threshold 320. Where absolute value 346 exceeds programmable data threshold 320, a counter 308 is cleared. Otherwise, where absolute value 346 is less than programmable data threshold 320, counter 308 continues to increment synchronous to a clock 348. A counter output 350 is provided to a comparator 310 where it is compared against a programmable bit count 322. Where counter output 350 exceeds programmable bit count 322, a media defect indication 354 is asserted based on data input 302.

Soft analysis circuit 343 includes a comparator 336 that compares soft input 332 against a programmable soft threshold 342 (it should be noted that soft input 332 may be provided to an absolute value circuit similar to circuit 304 if necessary). Where soft input 332 exceeds programmable soft threshold 342, a counter 338 is cleared. Otherwise, where soft input 332 is less than programmable soft threshold 342, counter 338 continues to increment synchronous to clock 348. A counter output 352 is provided to a comparator 340 where it is compared against a programmable bit count 344. Where counter output 352 exceeds programmable bit count 344, a media defect indication 356 is asserted based on soft input 332.

Media defect indication 354 and media defect indication 356 are combined by combination circuit 312. In some cases, combination circuit 312 performs the equivalent of a logical AND of media defect indication 354 and media defect indication 356, and the output of the logical AND is defect output 314. Performing such a combination operates to limit the possibility that a false positive is output from soft input defect detection circuit 300. In other cases, combination circuit 312 performs the equivalent of a logical OR of media defect indication 354 and media defect indication 356, and the output of the logical OR is defect output 314. Performing such a combination operates to limit the possibility that a false negative is output from soft input defect detection circuit 300. Based on the disclosure provided herein, one of ordinary skill in the art will recognize a variety of combination circuits that may be used to combine media defect indication 354 and media defect indication 356 to generate defect output 314.

Figure 3B:
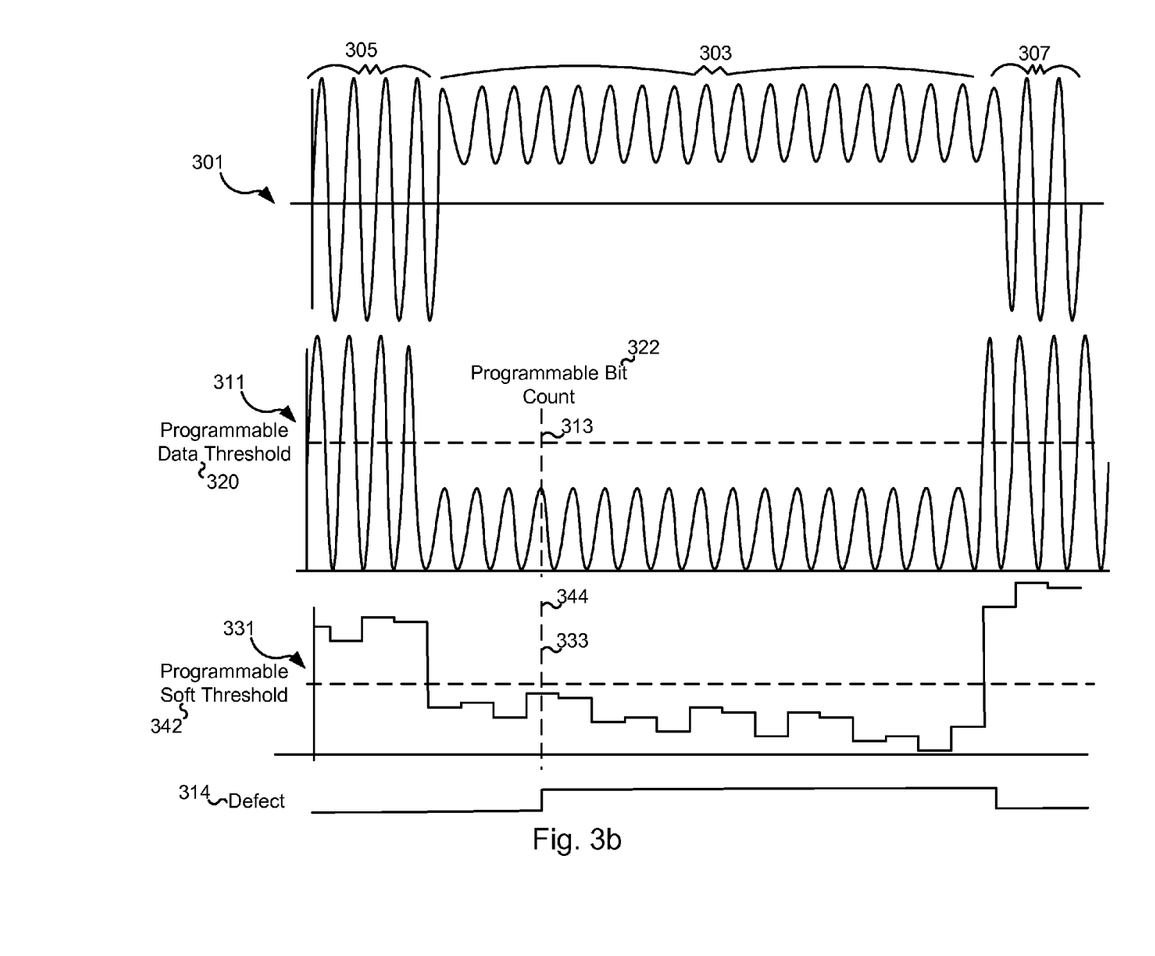

Turning to FIG. 3b, timing diagrams 301, 311, 331 depict the operation of soft input defect detection circuit 300 based on exemplary inputs consistent with those discovered in investigation. In particular, timing diagram 301 shows an exemplary data input 202 including periods where data is received from a non-defective medium 305, 307, and a period 303 where data is received from a defective medium. Of note, data from the defective portion includes a DC offset that may be eliminated through use of filter 375 of soft input defect detection circuit 300. Filter 375 may be designed using any filter techniques known in the art. In one particular embodiment of the present invention, filter 375 is a high pass filter. Such a high pass filter may for example, be simply f=1−ma, where ma is a moving average low pass filter. Where the number of taps is L (which my be programmable), the then the high pass filter is described by the following equation: f=1− [11 . . . ]/L. Further, data from the non-defective medium (portions 305, 307) exhibits a relatively high amplitude when compared with that from the defective medium (portion 303). Timing diagram 311 depicts the filtered, absolute value of the signal of timing diagram 301. In particular, the filtered, absolute value signal of timing diagram 311 represents signal 346 of soft input defect detection circuit 300 where mode select 379 selects filtered version 373 of data input 302. Satisfaction of the comparison with programmable bit count 322 is represented on timing diagram 311 as a dashed line 313. In this case, programmable bit count is four, and is satisfied as soon as four consecutive values of absolute value 346 are recorded below programmable data threshold 320. As previously discussed, as soon as these four consecutive periods have been achieved, media defect indication 354 is asserted. It should be noted that the number of four periods is merely exemplary and that any number of periods may be programmed in accordance with the various embodiments of the present invention.

Timing diagram 311 depicts soft input 332 (whether raw or the absolute value thereof) being compared to programmable soft threshold 342. Satisfaction of the comparison with programmable bit count 344 is represented on timing diagram 331 as a dashed line 333. In this case, programmable bit count is four, and is satisfied as soon as four consecutive values soft input 332 are recorded below programmable soft threshold 342. As previously discussed, as soon as these four consecutive periods have been achieved, media defect indication 356 is asserted. Again, it should be noted that the number of four periods is merely exemplary and that any number of periods may be programmed in accordance with the various embodiments of the present invention.

Defect output 314 is also shown. As shown, defect output 314 is asserted whenever either or both of media defect indication 354 and media defect indication 356 are asserted. Unlike that shown in FIG. 3b, in some cases programmable bit threshold 322 and programmable bit threshold 344 are satisfied at different points in time. In such a case, defect output 314 will assert at a different point in time depending upon whether combination circuit 312 is a logical AND function, a logical OR function, or some other function.

Figure 4A:
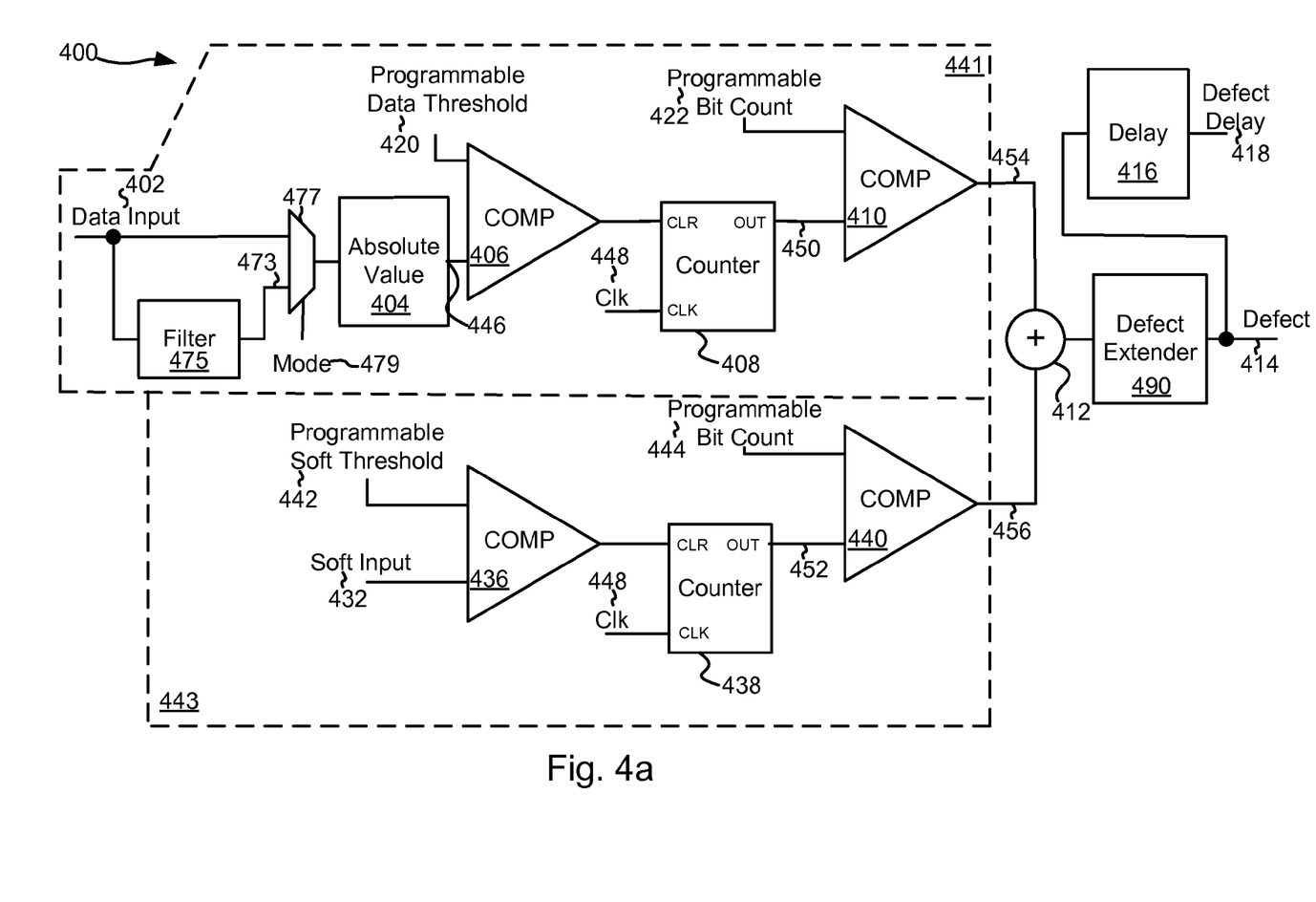
FIG. 4a shows yet another particular implementation of a defect detection circuit including a defect indication extender in accordance with one or more embodiments of the present invention.

Turning to FIG. 4a, a soft input defect detection circuit 400 in accordance with various embodiments of the present invention is shown. Soft input defect detection circuit 400 includes a data analysis circuit 441 (shown in dashed lines), a soft analysis circuit 443 (shown in dashed lines), and a combination circuit 412. Data analysis circuit 441 is designed to identify a potential media defect based on a data input 402 derived from a medium at issue. Soft analysis circuit 443 is designed to identify a potential media defect based on a soft input 432 received from a soft output detector (not shown). Combination circuit 412 is designed to combine the results of both data analysis circuit 441 and soft analysis circuit 443 to make a determination of whether a media defect exists, and based on the determination to assert a defect output 414.

Data analysis circuit 441 includes a filter 475 and a multiplexer 477 that allows for selection of either a raw data input 402, or a filtered version 473 of data input 402. Filter 475 may be designed using any filter techniques known in the art. In one particular embodiment of the present invention, filter 475 is a high pass filter. A mode selector 479 selects the desired data input 402 or filtered version 473. The output of multiplexer 477 is provided to an absolute value circuit 404. Absolute value circuit 404 receives the selected version of data input 402 and performs an offset process to yield the absolute value of the selected version of data input 402. An absolute value 446 of data input 402 is provided to a comparator 406 that compares the absolute value 446 against a programmable data threshold 420. Where absolute value 446 exceeds programmable data threshold 420, a counter 408 is cleared. Otherwise, where absolute value 446 is less than programmable data threshold 420, counter 408 continues to increment synchronous to a clock 448. A counter output 450 is provided to a comparator 410 where it is compared against a programmable bit count 422. Where counter output 450 exceeds programmable bit count 422, a media defect indication 454 is asserted based on data input 402.

Soft analysis circuit 443 includes a comparator 436 that compares soft input 432 against a programmable soft threshold 442 (it should be noted that soft input 432 may be provided to an absolute value circuit similar to circuit 404 if necessary). Where soft input 432 exceeds programmable soft threshold 442, a counter 438 is cleared. Otherwise, where soft input 432 is less than programmable soft threshold 442, counter 438 continues to increment synchronous to clock 448. A counter output 452 is provided to a comparator 440 where it is compared against a programmable bit count 444. Where counter output 452 exceeds programmable bit count 444, a media defect indication 456 is asserted based on soft input 432.

Media defect indication 454 and media defect indication 456 are combined by combination circuit 412. In some cases, combination circuit 412 performs the equivalent of a logical AND of media defect indication 454 and media defect indication 456, and the output of the logical AND is defect output 414. Performing such a combination operates to limit the possibility that a false positive is output from soft input defect detection circuit 400. In other cases, combination circuit 412 performs the equivalent of a logical OR of media defect indication 454 and media defect indication 456, and the output of the logical OR is defect output 414. Performing such a combination operates to limit the possibility that a false negative is output from soft input defect detection circuit 400. Based on the disclosure provided herein, one of ordinary skill in the art will recognize a variety of combination circuits that may be used to combine media defect indication 454 and media defect indication 456 to generate defect output 414.

Soft input defect detection circuit 400 also includes a defect extender circuit 490. Defect extender circuit 490 is a circuit that extends any assertion of defect output 414 for a determined period. This extension serves, among other things, to filter out false indications of a valid portion of a medium. Thus, for example, where defect output 414 is asserted, and on a subsequent cycle filtered, absolute value 446 exceeds a programmable data threshold 420 and/or a soft input 432 exceeds programmable soft threshold 442, defect output 414 will remain asserted until at least the determined period of defect extender circuit 490 has expired. Where, the occurrence of what appears to be a non-defective area is spurious, defect output 414 will not be de-asserted and re-asserted. Where, on the other hand, the occurrence of what appears to be a non-defective area continues for a period exceeding that of defect extender circuit 490, defect output 414 will de-assert at the end of the period of defect extender circuit 490. In some implementations defect extender circuit may provide feedback into other portions of soft input detection circuit 400. Based on the disclosure provided herein, one of ordinary skill in the art will recognize a variety of circuits including, for example, counter circuits that may be developed to implement an extender period in accordance with different embodiments of the present invention. Soft input defect detection circuit 400 may also include a delay circuit 416 that receives defect output 414 and delays it for use in a later stage decode/detection process where such is desired. The delayed output is identified as defect delay output 418.

Figure 4B:
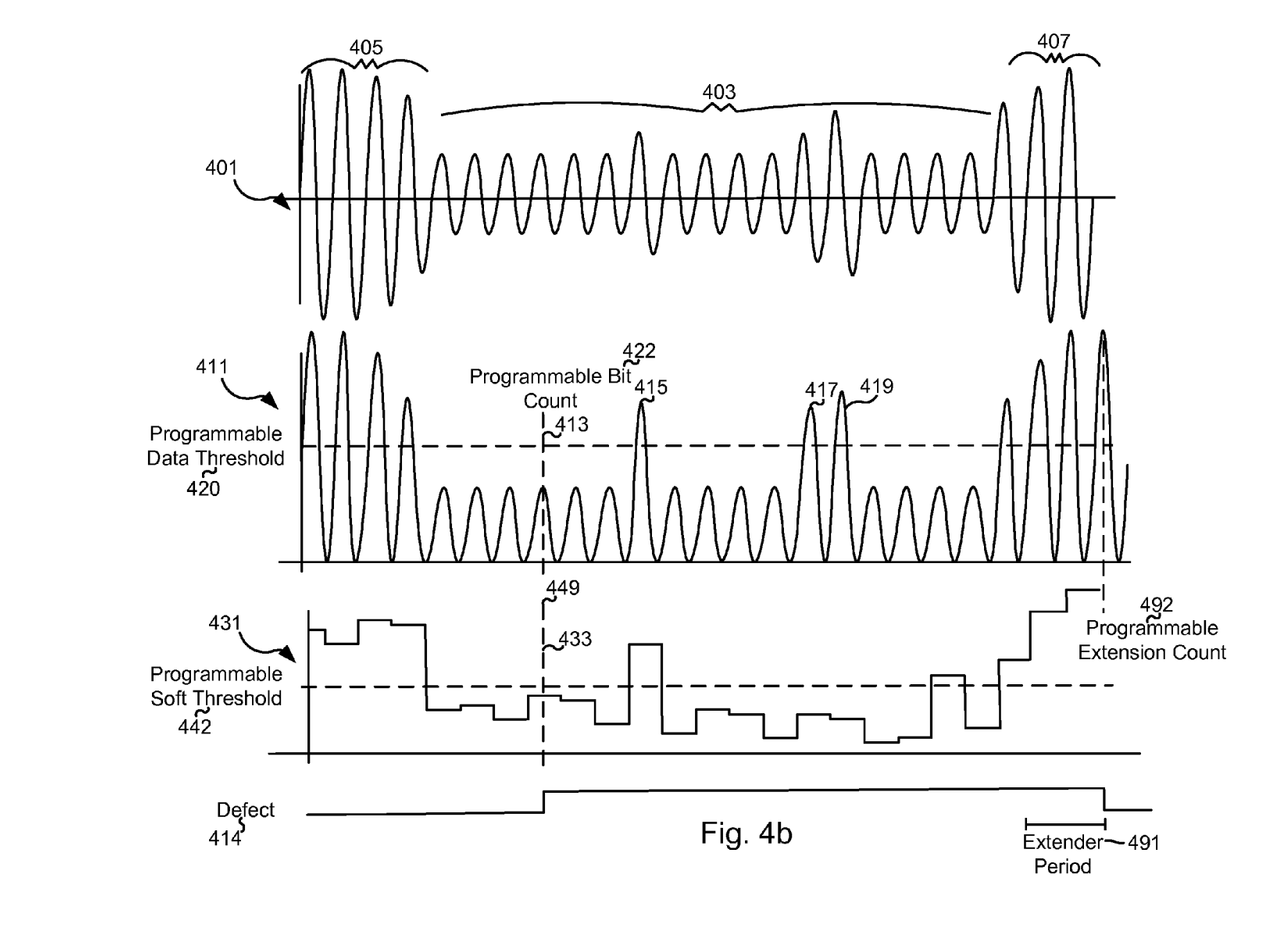

Turning to FIG. 4b, timing diagrams 401, 411, 431 depict the operation of soft input defect detection circuit 400 based on exemplary inputs consistent with those discovered in investigation. In particular, timing diagram 401 shows an exemplary data input 402 including periods where data is received from a non-defective medium 405, 407, and a period 403 where data is received from a defective medium. Of note, data from the defective portion may or may not include a DC offset as described more fully above in relation to FIG. 3b. Further, data from the non-defective medium (portions 405, 407) exhibits a relatively high amplitude when compared with that from the defective medium (portion 403). Timing diagram 411 depicts the filtered, absolute value of the signal of timing diagram 401. Of note, an occasional signal within period 403 exceeds programmable data threshold 420. In this case, defect extender circuit does not allow defect output 414 to reset during these spurious instances of what appears to be a non-defective portion of the medium. Rather, defect output 414 is held until an extender period 491 past the determined beginning of period 407. In this case, extender period is four clock cycles and is determined by comparison to a programmable extension count 492 indicated on the timing diagrams as a dashed line. It should be noted that the number of four clock cycles is merely exemplary and that different embodiments of the present invention may used different values and/or extender periods.

In particular, the filtered, absolute value signal of timing diagram 411 represents signal 446 of soft input defect detection circuit 400 where mode select 479 selects filtered version 473 of data input 402. Satisfaction of the comparison with programmable bit count 422 is represented on timing diagram 411 as a dashed line 413. In this case, programmable bit count is four, and is satisfied as soon as four consecutive values of absolute value 446 are recorded below programmable data threshold 420. As previously discussed, as soon as these four consecutive periods have been achieved, media defect indication 454 is asserted. It should be noted that instances 415, 417, 419 of signals exceeding programmable data threshold are inconsistent and include consecutive occurrences that are less than programmable extension count 492. Because of this, none of instances 415, 417, 419 cause defect output 414 to de-assert. Again, it should be noted that the number of four periods is merely exemplary and that any number of periods may be programmed in accordance with the various embodiments of the present invention.

Timing diagram 411 depicts soft input 432 (whether raw or the absolute value thereof) being compared to programmable soft threshold 442. Satisfaction of the comparison with programmable bit count 444 is represented on timing diagram 431 as a dashed line 433. In this case, programmable bit count is four, and is satisfied as soon as four consecutive values soft input 432 are recorded below programmable soft threshold 442. As previously discussed, as soon as these four consecutive periods have been achieved, media defect indication 456 is asserted. Again, it should be noted that the number of four periods is merely exemplary and that any number of periods may be programmed in accordance with the various embodiments of the present invention.

Defect output 414 is also shown. As shown, defect output 414 is asserted whenever either or both of media defect indication 354 and media defect indication 456 are asserted. Further, defect output 414 is not de-asserted until a consecutive number of what appear to be values from a non-defective region corresponding to programmable extension count 492 are received. Unlike that shown in FIG. 4b, in some cases programmable bit threshold 422 and programmable bit threshold 444 are satisfied at different points in time. In such a case, defect output 414 will assert at a different point in time depending upon whether combination circuit 412 is a logical AND function, a logical OR function, or some other function.

Figure 5:
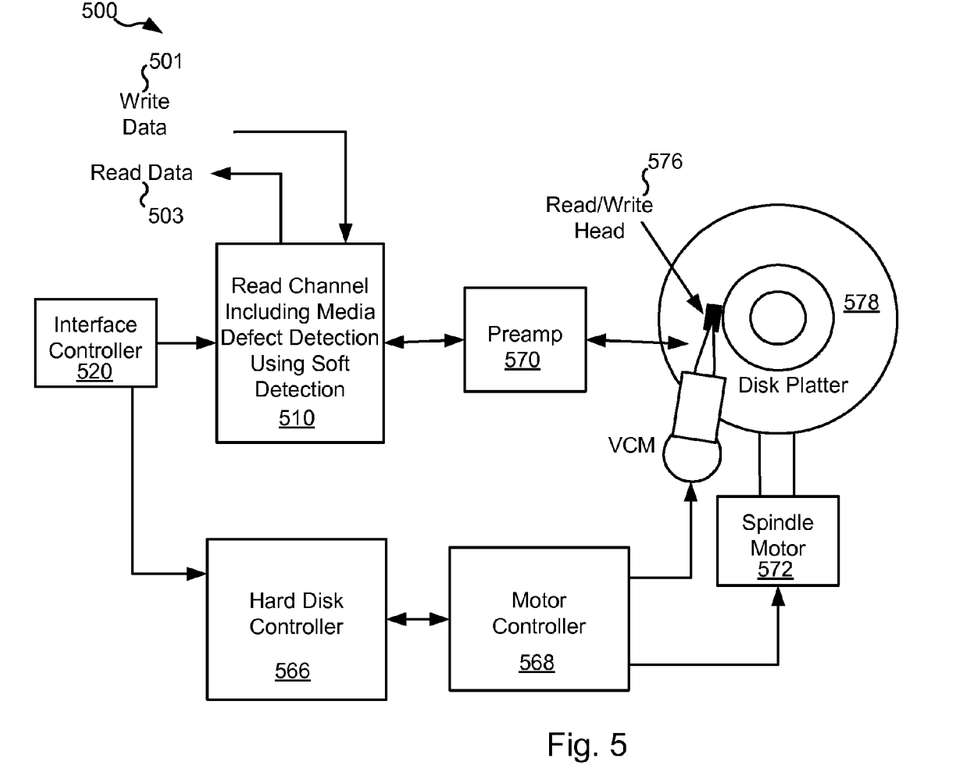
FIG. 5 depicts a storage system including a media defect system in accordance with various embodiments of the present invention.

Turning to FIG. 5, a storage system 500 including a media defect system is shown in accordance with various embodiments of the present invention. Storage system 500 may be, for example, a hard disk drive. Storage system 500 includes a read channel 510 with an incorporated media defect detector. The incorporated media defect detector may be any media defect detector capable of using soft information to form a determination of a media defect. Thus, for example, the incorporated media defect detector may be, but is not limited to, any of soft input defect detection circuits 200, 300, 400. In addition, storage system 500 includes an interface controller 520, a preamp 570, a hard disk controller 566, a motor controller 568, a spindle motor 572, a disk platter 578, and a read/write head 576. Interface controller 520 controls addressing and timing of data to/from disk platter 578. The data on disk platter 578 consists of groups of magnetic signals that may be detected by read/write head assembly 576 when the assembly is properly positioned over disk platter 578. In a typical read operation, read/write head assembly 576 is accurately positioned by motor controller 568 over a desired data track on disk platter 578. Motor controller 568 both positions read/write head assembly 576 in relation to disk platter 578 and drives spindle motor 572 by moving read/write head assembly to the proper data track on disk platter 578 under the direction of hard disk controller 566. Spindle motor 572 spins disk platter 578 at a determined spin rate (RPMs).

Once read/write head assembly 578 is positioned adjacent the proper data track, magnetic signals representing data on disk platter 578 are sensed by read/write head assembly 576 as disk platter 578 is rotated by spindle motor 572. The sensed magnetic signals are provided as a continuous, minute analog signal representative of the magnetic data on disk platter 578. This minute analog signal is transferred from read/write head assembly 576 to read channel module 564 via preamp 570. Preamp 570 is operable to amplify the minute analog signals accessed from disk platter 578. In addition, preamp 570 is operable to amplify data from read channel module 510 that is destined to be written to disk platter 578. In turn, read channel module 510 decodes (including media defect detection) and digitizes the received analog signal to recreate the information originally written to disk platter 578. This data is provided as read data 503 to a receiving circuit. A write operation is substantially the opposite of the preceding read operation with write data 501 being provided to read channel module 510. This data is then encoded and written to disk platter 578.

Figure 6:
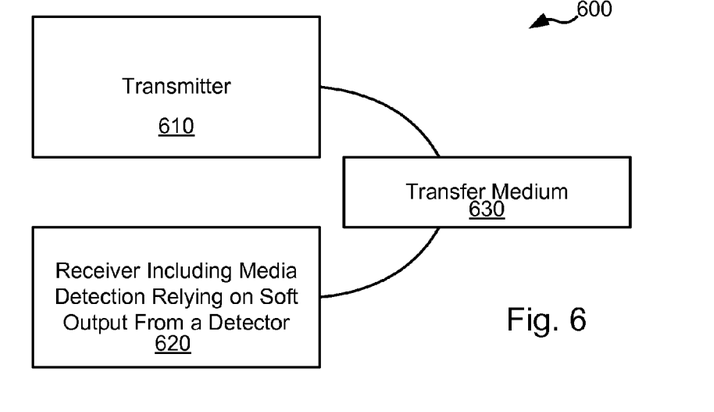
FIG. 6 depicts a communication system including a media defect system in accordance with one or more embodiments of the present invention.

Turning to FIG. 6, a communication system 600 including a receiver 620 with a media defect system in accordance with one or more embodiments of the present invention is shown. Communication system 600 includes a transmitter that is operable to transmit encoded information via a transfer medium 630 as is known in the art. The encoded data is received from transfer medium 630 by receiver 620. Receiver 620 incorporates a media defect detection circuit that is operable to determine whether a "defect" has occurred in transfer medium 630. Thus, for example, where transfer medium 620 is the Internet, it may determine that no signal is being received. Alternatively, where transfer medium 620 is the atmosphere carrying wireless signals, the media defect detection circuit may indicate a very noisy and unreliable transfer environment. Based on the disclosure provided herein, one of ordinary skill in the art will recognize a variety of mediums that may include defects and that may be utilized in relation to different embodiments of the present invention. The incorporated media defect detector may be any media defect detector capable of using soft information to form a determination of a media defect. Thus, for example, the incorporated media defect detector may be, but is not limited to, any of soft input defect detection circuits 200, 300, 400.

Figure 7:
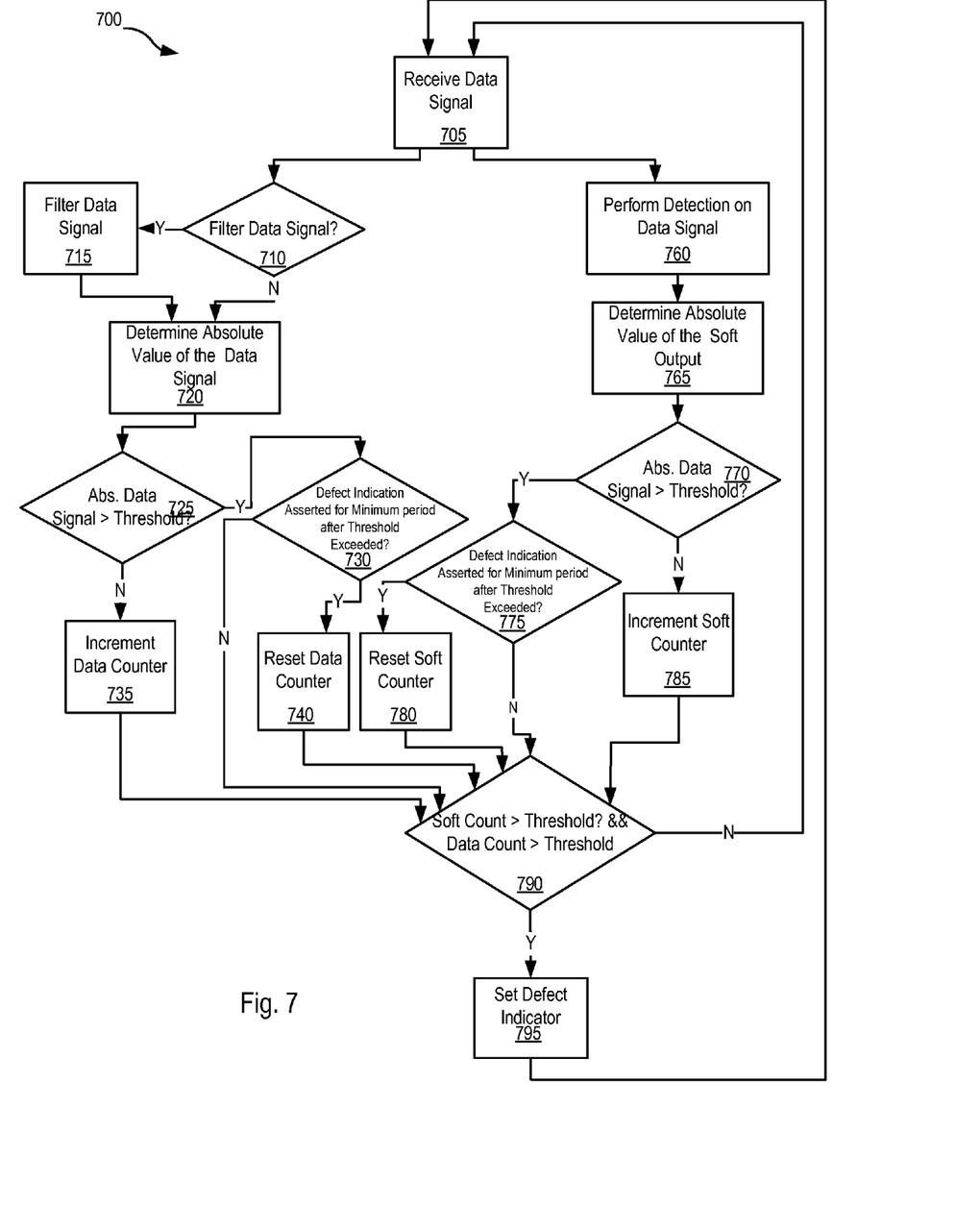
FIG. 7 is a flow diagram depicting a method for media defect detection in accordance with some embodiments of the present invention.

Turning to FIG. 7, a flow diagram 700 depicts a method for media defect detection in accordance with some embodiments of the present invention. Following flow diagram 700, a data signal is received (block 705). This data signal may be, or example, a stream of data received during a read from a hard disk drive or a stream of data received by a communication device. Based on the disclosure provided herein, one of ordinary skill in the art will recognize a variety of data signals and signal sources that may be used in relation to different embodiments of the present invention.

Data detection is performed on the received data signal (block 760). Such data detection may include, but is not limited to, performing a Viterbi algorithm. This data detection process generates a soft output indicating the likelihood that the data is correct. Then, and absolute value of the provided soft output is created (block 765). The absolute value of the soft output is then compared against a soft threshold (block 770). This soft threshold may be programmable via, for example, a soft threshold register. Where the absolute value of the soft output is less than the soft threshold (block 770), a soft counter is incremented (block 785). Alternatively, where the absolute value of the soft output exceeds the soft threshold (block 770), it is additionally determined whether the defect indicator was previously, and if it was asserted for at least a minimum or extended period (block 775). Where the defect indicator was previously asserted for the extended period or where it was not asserted at all (block 775), the soft counter is reset (block 780). Alternatively, where the defect indicator was asserted and has not been asserted for at least the minimum or extended period (block 775), the soft counter is not reset.

In addition, it is determined whether the received data signal is to be filtered (block 710). Where the signal is to be filtered (block 710), the signal is filtered (block 715). This may include, for example, passing the signal through a high pass filter to remove any low frequency offset. In any event, an absolute value of either the filtered signal or the raw signal is determined (block 720). The absolute value of the data signal is then compared against a data threshold (block 725). The data threshold may be programmable via, for example, a data threshold register. Where the absolute value of the data signal is less than the data threshold (block 725), a data counter is incremented (block 735). Alternatively, where the absolute value of the data signal exceeds the data threshold (block 725), it is additionally determined whether the defect indicator was previously asserted, and if it was asserted for at least a minimum or extended period (block 730). Where the defect indicator was previously asserted for the extended period or where it was not asserted at all (block 730), the data counter is reset (block 740). Alternatively, where the defect indicator was asserted and has not been asserted for at least the minimum or extended period (block 730), the data counter is not reset.

It is then determined whether a combination of the soft count and the data count each exceeds a respective threshold value (block 790). In some cases, this includes comparing the soft count against a soft count threshold and the data count against a data threshold. In some cases, each of the aforementioned thresholds may be programmable via respective registers. Where a logic AND function (as depicted in block 790) is implemented, the defect indicator is asserted (block 795) where both the soft count exceeds the soft count threshold and the data count exceeds the data count threshold. In this case, where either the soft count does not exceed the soft count threshold or the data count does not exceed the data count threshold, the defect indicator is not asserted at that point. Alternatively, where a logic OR function (not depicted in block 790) is implemented, the defect indicator is asserted (block 795) where either of the soft count exceeds the soft count threshold and the data count exceeds the data count threshold. In this case, where the soft count does not exceed the soft count threshold and the data count does not exceed the data count threshold, the defect indicator is not asserted at that point In conclusion, the invention provides novel systems, devices, methods and arrangements for detecting media defects. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscriber line systems. Therefore, the above description should not be taken as limiting the scope of the invention, which is defined by the appended claims.

What is claimed is:

1. A data transfer system, wherein the decoding system comprises:
    a data detector circuit operable to apply a data detection algorithm to a detector input to yield a soft output;
    a defect detector circuit including:
        a soft analysis circuit including a comparator operable to compare the soft output against a soft threshold value;
        a first counter circuit operable to determine a number of periods that the soft output is below the soft threshold;
        a data analysis circuit including a first comparator operable to compare an absolute value of a data signal against a data threshold value, and a second counter circuit operable to determine a number of periods that the absolute value of the data signal is below the data threshold value.

2. The system of claim 1, wherein the data detection algorithm is selected from a group consisting of: a Viterbi detection algorithm and a maximum a posteriori probability detection algorithm.

3. The system of claim 1, wherein the system is a hard disk drive, wherein the hard disk drive includes a storage medium, wherein the detector input is derived from the storage medium, and wherein the defect detector is operable to detect defective regions on the storage medium.

4. The system of claim 1, wherein the detector input is filtered using a high pass filter prior to comparison against the data threshold value.

5. The system of claim 1, wherein the data threshold value is programmable.

6. The system of claim 1, wherein the soft threshold value is programmable.

7. The system of claim 1, wherein the defect indication is asserted whenever at least one of the first counter and the second counter exceeds a count threshold.

8. The system of claim 7, wherein the first counter is reset whenever the absolute value of the data signal exceeds the data signal threshold, and wherein the second counter is reset whenever the soft output exceeds the soft threshold.

9. The system of claim 8, wherein once the defect indication is asserted, it is maintained asserted for at least a minimum period.

10. The system of claim 9, wherein the minimum period is programmable.

11. The system of claim 1, wherein the system is a communication device, wherein the communication device receives information via a communication channel, wherein the data signal is derived from the communication channel, wherein the data detector receives the data signal derived from the communication channel and provides the soft output based at least in part on the data signal, and wherein the defect detector is operable to detect defective periods of the communication channel.

12. A method for defect detection, the method comprising:
    applying a data detection algorithm to a data signal using a data detector circuit to yield a soft output;
    comparing the data signal to a data threshold;
    asserting a data comparison result whenever the data signal is less than the data threshold for a first determined period;
    comparing the soft output to a soft threshold;
    asserting a soft comparison result whenever the soft output is less than the soft threshold for a second determined period; and
    asserting a defect indicator whenever at least one of the soft comparison result and the data comparison result is asserted.

13. The method of claim 12, wherein asserting the defect indicator occurs only when both of the soft comparison result and the data comparison result are asserted.

14. The method of claim 12, wherein the first determined period and the second determined period are the same period, and wherein the same period is programmable.

15. The method of claim 12, wherein the method further comprises:
    determining an absolute value of the data signal, wherein the data signal that is compared with the data threshold is the absolute value of the data signal.

16. The method of claim 12, wherein the method further comprises:
    determining an absolute value of the soft output, wherein the soft output that is compared with the soft threshold is the absolute value of the soft output.

17. The method of claim 12, wherein the method further comprises:

filtering the data signal, wherein the data signal that is compared with the data threshold is the filtered data signal.

18. The method of claim 12, wherein the first determined period is programmable, and wherein the second determined period is programmable.

19. The method of claim 12, wherein at least on of the first determined period and the second determined period is greater than a minimum period.

20. The method of claim 12, wherein the first determined period is different from the second determined period.

* * * * *